(12) United States Patent
Peng

(10) Patent No.: US 9,391,883 B2
(45) Date of Patent: Jul. 12, 2016

(54) METHOD AND DEVICE FOR LABEL AUTOMATIC ALLOCATION IN RING NETWORK PROTECTION

(71) Applicant: Huawei Technologies Co., Ltd., Shenzhen, Guangdong (CN)

(72) Inventor: Min Peng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 178 days.

(21) Appl. No.: 14/086,615

(22) Filed: Nov. 21, 2013

(65) Prior Publication Data

US 2014/0211664 A1    Jul. 31, 2014

(30) Foreign Application Priority Data

Nov. 22, 2012 (CN) .......................... 2012 1 0478582

(51) Int. Cl.
*H04L 12/723* (2013.01)
*H04L 12/703* (2013.01)
*H04L 12/437* (2006.01)

(52) U.S. Cl.
CPC ............ *H04L 45/507* (2013.01); *H04L 12/437* (2013.01); *H04L 45/28* (2013.01)

(58) Field of Classification Search
None
See application file for complete search history.

(56) References Cited

U.S. PATENT DOCUMENTS

| 5,321,136 A | 6/1994 | McCapra |
| 5,514,821 A | 5/1996 | Bennani et al. |
| 5,593,829 A | 1/1997 | McCabe |
| 5,656,742 A | 8/1997 | McCabe |
| 7,055,862 B2 | 6/2006 | Viby |
| 7,088,679 B2 | 8/2006 | Behzadi |
| 7,451,241 B2 | 11/2008 | Behzadi |
| 7,680,136 B2 | 3/2010 | Miyazaki et al. |
| 7,697,461 B2 | 4/2010 | Shi et al. |

(Continued)

FOREIGN PATENT DOCUMENTS

| CN | 1949766 A | 4/2007 |
| CN | 101005442 A | 7/2007 |

(Continued)

OTHER PUBLICATIONS

Bocci et al., "MPLS-TP Identifiers," MPLS Working Group, IETF Trust (Mar. 8, 2010).

(Continued)

*Primary Examiner* — Brandon Renner
*Assistant Examiner* — Manuel Rangel
(74) *Attorney, Agent, or Firm* — Leydig, Voit & Mayer, Ltd.

(57) ABSTRACT

Embodiments of the present invention provide a method and device for label automatic allocation in ring network protection. The method includes: after physical topology configuration of ring network protection is completed, if connectivity detection between a first node and a downstream node of a ring tunnel is UP, receiving, a first label distribution message sent by the downstream node; sending, by the first node according to the identifier indicating that the tail node label is ready, a second label distribution message to the upstream node; so that the upstream node learns that label allocation for all nodes on the ring tunnel between the first node and a tail node is completed. The method solves problems in the prior art that a workload for configuration of a working ring is big and availability of an end-to-end service cannot be ensured.

20 Claims, 12 Drawing Sheets

A1 and A2 form a ring tunnel

B8, B7, B6 and B5 form a ring tunnel

(56) References Cited

U.S. PATENT DOCUMENTS

| | | | |
|---|---|---|---|
| 7,951,603 | B2 | 5/2011 | Amano |
| 7,954,855 | B2 | 6/2011 | Viby |
| 2002/0096874 | A1 | 7/2002 | Viby |
| 2003/0108029 | A1 | 6/2003 | Behzadi |
| 2004/0213943 | A1 | 10/2004 | Viby |
| 2006/0193257 | A1 | 8/2006 | Behzadi |
| 2006/0209860 | A1 | 9/2006 | Miyazaki et al. |
| 2007/0230368 | A1 | 10/2007 | Shi et al. |
| 2008/0238084 | A1 | 10/2008 | Hung |
| 2008/0304407 | A1 | 12/2008 | Umansky et al. |
| 2009/0040922 | A1 | 2/2009 | Umansky et al. |
| 2009/0069592 | A1 | 3/2009 | Suzuki et al. |
| 2011/0007628 | A1* | 1/2011 | Tochio .............. H04L 12/437 370/224 |
| 2011/0058501 | A1* | 3/2011 | Harada .............. H04L 45/02 370/254 |
| 2012/0281705 | A1* | 11/2012 | Ye .............. H04L 45/28 370/395.5 |
| 2013/0155874 | A1 | 6/2013 | Sha et al. |
| 2014/0149602 | A1* | 5/2014 | Madaiah .............. H04L 12/437 709/238 |
| 2014/0348028 | A1 | 11/2014 | Chen et al. |

FOREIGN PATENT DOCUMENTS

| | | | |
|---|---|---|---|
| CN | 101431459 | A | 5/2009 |
| CN | 101494511 | A | 7/2009 |
| CN | 101599862 | A | 12/2009 |
| CN | 101917290 | A | 12/2010 |
| CN | 102035712 | A | 4/2011 |
| CN | 102143043 | A | 8/2011 |
| CN | 102195832 | A | 9/2011 |
| CN | 102404145 | A | 4/2012 |
| CN | 102684973 | A | 9/2012 |
| EP | 0987670 | A2 | 3/2000 |
| EP | 0987670 | A3 | 4/2000 |
| EP | 1536213 | A2 | 6/2005 |
| EP | 1536213 | A3 | 2/2007 |
| EP | 2701345 | A1 | 2/2014 |
| JP | 2002190817 | A | 6/2002 |
| JP | 2003224586 | A | 8/2003 |
| JP | 2011019092 | A | 1/2011 |
| JP | 2015504284 | A | 2/2015 |
| WO | 2007082432 | A1 | 7/2007 |

OTHER PUBLICATIONS

"T-MPLS Ring Protection—Draft ITU-T Recommendation G.8132 (T-MPLS shared protection ring)," ITU-T SG15 Q9/15 Meeting, Madeira, ITU (Nov. 2007).

Ward et al., "MPLS Architectural Considerations for a Transport Profile," ITU-T—IETF Joint Working Team (Apr. 18, 2008).

"Series G: Transmission Systems and Media, Digital Systems and Networks; Digital Transmission Systems—Digital Networks—SDH Network Characteristics; Types and Characteristics of SDH Network Protection Architectures," ITU-T Recommendation G.841, ITU (Oct. 1998).

"Series G: Transmission Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Operation, administration and maintenance; OAM functions and mechanisms for Ethernet based networks," ITU-T Recommendation G.8013/Y.1731, ITU (Jul. 2011).

* cited by examiner

A1 and A2 form a ring tunnel

B8, B7, B6 and B5 form a ring tunnel

After physical topology configuration of a ring network is completed, test connectivity between adjacent nodes, and if a first node is an intermediate node of a ring tunnel, and connectivity detection between a downstream node and the first node is UP, the first node receives a first label distribution message sent by the downstream node, where the first label distribution message includes: an identifier of a ring bearing the ring tunnel, an identifier of a tail node of the ring tunnel, an identifier indicating that a tail node label is ready, and a first label allocated by the downstream node for the ring tunnel ⟶ 501

According to the identifier indicating that the tail node label is ready in the first label distribution message, when connectivity detection between the first node and the upstream node is UP, the first node sends a second label distribution message to the upstream node, where the second label distribution message includes: the identifier of the ring bearing the ring tunnel, the identifier of the tail node of the ring tunnel, the identifier indicating that the tail node label is ready, and a second label allocated by the first node for the ring tunnel; so that the upstream node learns, according to the identifier indicating that the tail node label is ready, that label allocation of all nodes on the ring tunnel between the first node and the tail node corresponding to the identifier of the tail node of the ring tunnel is completed; if the upstream node is not a head node of the ring tunnel, according to the identifier indicating that the tail node label is ready in the second label distribution message, when connectivity detection between the upstream node and a second node is UP, the upstream node sends a third label distribution message to the second node, until the head node on the ring tunnel receives a fourth label distribution message sent by a downstream adjacent node of the head node on the ring tunnel, and learns, according to the identifier indicating that the tail node label is ready in the fourth label distribution message, that label allocation of all nodes on the ring tunnel except the head node is completed, and the ring tunnel starts to bear a service ⟶ 502

FIG. 5B

| If connectivity detection between a first node and an upstream node is UP, the first node sends a fifth label distribution message to the upstream node, where the fifth label distribution message includes: an identifier of a ring bearing a ring tunnel, an identifier of a tail node of the ring tunnel, an identifier indicating that a tail node label is not ready, and a second label allocated by the first node for the ring tunnel; so that the upstream node acquires, according to the identifier indicating that the tail node label is not ready, that label allocation for one or more nodes, between the first node to a tail node corresponding to the identifier of a tail node of the ring tunnel, is not completed | 501a |

↓

| After physical topology configuration of a ring network is completed, test connectivity between adjacent nodes, and if the first node is an intermediate node of the ring tunnel, and connectivity detection between a downstream node and the first node is UP, the first node receives a first label distribution message sent by the downstream node, where the first label distribution message includes: the identifier of the ring bearing the ring tunnel, the identifier of the tail node of the ring tunnel, the identifier indicating that the tail node label is ready, and a first label allocated by the downstream node for the ring tunnel | 501 |

↓

| According to the identifier indicating that the tail node label is ready in the first label distribution message, when connectivity detection between the first node and the upstream node is UP, the first node sends a second label distribution message to the upstream node, where the second label distribution message includes: the identifier of the ring bearing the ring tunnel, the identifier of the tail node of the ring tunnel, the identifier indicating that the tail node label is ready, and the second label allocated by the first node for the ring tunnel; so that the upstream node learns, according to the identifier indicating that the tail node label is ready, that label allocation of all nodes on the ring tunnel between the first node and the tail node corresponding to the identifier of the tail node of the ring tunnel is completed; if the upstream node is not a head node of the ring tunnel, according to the identifier indicating that a tail node label is ready in the second label distribution message, when connectivity detection between the upstream node and a second node is UP, the upstream node sends a third label distribution message to the second node, until the head node on the ring tunnel receives a fourth label distribution message sent by a downstream adjacent node of the head node on the ring tunnel, and learns, according to the identifier indicating that the tail node label is ready in the fourth label distribution message, that label allocation of all nodes on the ring tunnel except the head node is completed, and the ring tunnel starts to bear a service | 502 |

FIG. 6

| | 7 | 6 | 5 | 4 | 3 | 2 | 1 | 0 |
|---|---|---|---|---|---|---|---|---|
| 1 | colspan="8" | type(62) |||||||
| 2 | colspan="8" | length(11) |||||||
| 3 | colspan="8" | Node id (Leaving node identifier) |||||||
| 4 | colspan="8" rowspan="4" | Ring id (Ring identifier) |||||||
| 5 ||||||||||
| 6 ||||||||||
| 7 ||||||||||
| 8 | colspan="8" rowspan="2" | Working path in- label (Working tunnel in-label) |||||||
| 9 ||||||||||
| 10 | | | | | E | colspan="3" | reserved |||
| 11 | colspan="8" rowspan="2" | Protection path in- label (Protection tunnel in-label) |||||||
| 12 ||||||||||
| 13 | colspan="4" | | | | | colspan="4" | reserved ||||

FIG. 7

|   | 1 | 2 | 3 | 4 |
|---|---|---|---|---|
| 1 | 7 6 5 4 3 2 1 0 | 7 6 5 4 3 2 1 0 | 7 6 5 4 3 2 1 0 | 7 6 5 4 3 2 1 0 |
| 5 | MEL  Version ( 0 ) | OpCode ( CCM=1 ) | Flags | Tlv offset ( 83 ) |
| 9 | Sequnce number ( 0 ) ||||
| 13 | MEPID ||||
| 17 |  ||||
| 21 |  ||||
| 25 |  ||||
| 29 |  ||||
| 33 |  ||||
| 37 | MEG ID(48 octects) ||||
| 41 |  ||||
| 45 |  ||||
| 49 |  ||||
| 53 |  ||||
| 57 |   |   | TxFCf ||
| 61 | TxFCf || RxFCb ||
| 65 | RxFCb || TxFCb ||
| 69 | TxFCb || reserved ( 0 ) ||
| 73 | Reserved ( 0 ) || Type (62) | Length (11) |
| 77 | Node id || ringid ||
| 81 | Ring id | working path in-label || E  reserved |
| 85 | protection path in-label || reserved | EndTlv ( 0 ) |

FIG. 9

After a ring tunnel bears a service, if a first node is an intermediate node on the ring tunnel, the first node receives a first label retention message sent by a downstream node ⎯ 1001

If connectivity detection between the first node and the downstream node is Down, the first node retains, according to the first label retention message, a first label allocated by the downstream node for the ring tunnel, and after the connectivity detection between the first node and the downstream node is updated to UP, continues to forward the service by adopting the retained first label allocated by the downstream node for the ring tunnel ⎯ 1002

FIG. 10

```
┌─────────────────────────────────────────────────────────────┐
│   After a ring tunnel bears a service, if a first node is an intermediate node │
│      on the ring tunnel, the first node receives N first label distribution    │
│       messages, where the first label distribution messages are sent by the    │    1101
│          downstream node to the first node periodically, and the first label   │
│        distribution message includes: an identifier of a ring bearing the ring │
│           tunnel, an identifier of a tail node of the ring tunnel, an identifier│
│     indicating that a tail node label is ready, and a first label allocated by the│
│                    downstream node for the ring tunnel                          │
└─────────────────────────────────────────────────────────────┘
                                 ▼
┌─────────────────────────────────────────────────────────────┐
│       The first node, after continuously receiving N first label distribution  │
│     messages, receives a first label retention message sent by a downstream    │    1102
│    node, where the first label retention message includes: the identifier of the│
│            tail node and the identifier of the ring bearing the ring tunnel    │
└─────────────────────────────────────────────────────────────┘
                                 ▼
┌─────────────────────────────────────────────────────────────┐
│  If connectivity detection between the first node and the downstream node      │
│            is Down, the first node retains, according to the first label retention│
│       message, the first label allocated by the downstream node for the ring   │    1103
│    tunnel, and after the connectivity detection between the first node and the │
│     downstream node is updated to UP, continues to forward the service by      │
│       adopting the retained first label allocated by the downstream node for the│
│                                  ring tunnel                                    │
└─────────────────────────────────────────────────────────────┘
                                 ▼
┌─────────────────────────────────────────────────────────────┐
│   After the ring tunnel bears a service, if the first node is an intermediate  │
│       node on the ring tunnel, the first node sends N second label distribution│
│        messages to the upstream node, where the second label distribution      │    1104
│         messages are sent by the first node periodically, and the second label │
│        distribution message includes: the identifier of the ring bearing the ring│
│         tunnel, the identifier of the tail node of the ring tunnel, the identifier│
│    indicating that the tail node label is ready, and a second label allocated by│
│                       the first node for the ring tunnel                        │
└─────────────────────────────────────────────────────────────┘
                                 ▼
┌─────────────────────────────────────────────────────────────┐
│      The first node, after sending N continuous second label distribution      │
│       messages, sends a second label retention message to the upstream node,   │
│   where the second label retention message includes: the identifier of the tail│
│         node and the identifier of the ring bearing the ring tunnel; and when  │    1105
│         connectivity detection between the first node and the upstream node is │
│    Down, the upstream node retains, according to the second label retention    │
│    message, a second label allocated by the first node for the ring tunnel, and│
│     after the connectivity detection between the first node and the upstream   │
│     node is updated to UP, continues to forward the service by adopting the    │
│       retained second label allocated by the first node for the ring tunnel    │
└─────────────────────────────────────────────────────────────┘
```

FIG. 11

|   | 7 | 6 | 5 | 4 | 3 | 2 | 1 | 0 |
|---|---|---|---|---|---|---|---|---|
| 1 | type(63) ||||||||
| 2 | length(4) ||||||||
| 3 | Ring id (Ring identifier) ||||||||
| 4 | ||||||||
| 5 | ||||||||
| 6 | ||||||||

FIG. 12

|   | 7 | 6 | 5 | 4 | 3 | 2 | 1 | 0 |
|---|---|---|---|---|---|---|---|---|
| 1 | type(64) ||||||||
| 2 | length(5) ||||||||
| 3 | Node id ||||||||
| 4 | Ring id (Ring identifier) ||||||||
| 5 | ||||||||
| 6 | ||||||||
| 7 | ||||||||

FIG. 13

METHOD AND DEVICE FOR LABEL AUTOMATIC ALLOCATION IN RING NETWORK PROTECTION

CROSS-REFERENCE TO RELATED APPLICATION

This application claims priority to Chinese Patent Application No. 201210478582.5, filed on Nov. 22, 2012, which is hereby incorporated by reference in its entirety.

TECHNICAL FIELD

The present invention relates to the field of communications, and in particular, to a method and device for label automatic allocation in ring network protection.

BACKGROUND

Multi-protocol label switching (Multi-Protocol Label Switching, MPLS for short) is a system used for rapid data packet switching and routing, which provides capabilities such as targeting, routing, forwarding and switching for network data traffic. Currently, a multi-protocol label switching transport profile (MPLS Transport Profile, MPLS-TP for short) is mainly applied to a static scenario, and therefore, after an MPLS-TP ring network protection technology emerges, static allocation is adopted for label allocation.

Specifically, when configuring a ring tunnel, a network administrator needs to search for remaining labels on a single device, so as to allocate a corresponding working tunnel label and a protection tunnel label for each off-ring node to serve as ring tunnel labels.

In the MPLS-TP, a working tunnel and a protection tunnel need to be established for each ring separately, and each working tunnel label is unique on the ring.

Ring network forwarding requires a large number of labels, so an existing static label configuration manner has a big workload for configuration. Further, in a static solution, each node on the ring can be applied to a service as long as configuration of the node is completed, which cannot ensure availability of an end-to-end service.

SUMMARY

In view of this, embodiments of the present invention provide a method and device for label automatic allocation in ring network protection, so as to solve problems in the prior art that a workload for configuration of a working ring is big and availability of an end-to-end service cannot be ensured.

In a first aspect, a method for label automatic allocation in ring network protection is provided, including:

after physical topology configuration of ring network protection is completed, testing connectivity between adjacent nodes, if a first node is an intermediate node of a ring tunnel, and connectivity detection between a downstream node and the first node is UP, receiving, by the first node, a first label distribution message sent by the downstream node, where the first label distribution message includes: an identifier of a ring bearing the ring tunnel, an identifier of a tail node of the ring tunnel, an identifier indicating that a tail node label is ready, and a first label allocated by the downstream node for the ring tunnel;

according to the identifier indicating that the tail node label is ready in the first label distribution message, when connectivity detection between the first node and an upstream node is UP, sending, by the first node, a second label distribution message to the upstream node, where the second label distribution message includes: the identifier of the ring bearing the ring tunnel, the identifier of the tail node of the ring tunnel, the identifier indicating that the tail node label is ready, and a second label allocated by the first node for the ring tunnel; so that the upstream node learns, according to the identifier indicating that the tail node label is ready, that label allocation for all nodes on the ring tunnel between the first node and the tail node corresponding to the identifier of the tail node of the ring tunnel is completed; and if the upstream node is not a head node on the ring tunnel, according to the identifier indicating that the tail node label is ready in the second label distribution message, when connectivity detection between the upstream node and a second node is UP, sending, by the upstream node, a third label distribution message to the second node, until the head node on the ring tunnel receives a fourth label distribution message sent by a downstream adjacent node of the head node on the ring tunnel, and learns, according to the identifier indicating that the tail node label is ready in the fourth label distribution message, that label allocation of all nodes on the ring tunnel except the head node is completed, and starting, by the ring tunnel, to bear a service, where, the second node is an adjacent upstream node of the upstream node on the ring tunnel, the upstream node and the first node are adjacent nodes on the ring tunnel, and the first node and the downstream node are adjacent nodes on the ring tunnel.

In combination with the first aspect, in a first possible implementation manner, the first label includes: a working tunnel label allocated by the downstream node for the ring tunnel, and the second label includes: a working tunnel label allocated by the first node for the ring tunnel;

or, the first label includes: a protection tunnel label allocated by the downstream node for the ring tunnel, and the second label includes: a protection tunnel label allocated by the first node for the ring tunnel;

or, the first label includes: a working tunnel label and a protection tunnel label allocated by the downstream node for the ring tunnel, and the second label includes: a working tunnel label and a protection tunnel label allocated by the first node for the ring tunnel.

In combination with the first aspect, in a second possible implementation manner, before the step of receiving, by the first node, the first label distribution message sent by the downstream node, the method further includes:

if the connectivity detection between the first node and the upstream node is UP, sending, by the first node, a fifth label distribution message to the upstream node, where the fifth label distribution message includes: the identifier of the ring bearing the ring tunnel, the identifier of the tail node of the ring tunnel, an identifier indicating that the tail node label is not ready, and the second label allocated by the first node for the ring tunnel; so that the upstream node learns, according to the identifier indicating that the tail node label is not ready, that label allocation for one or more nodes between the first node and the tail node corresponding to the identifier of the tail node of the ring tunnel is not completed.

In combination with the first aspect, in a third possible implementation manner, the method further includes:

if the first node is the tail node on the ring tunnel, and the connectivity detection between the first node and the upstream node is UP, sending, by the first node, the second label distribution message to the upstream node.

In combination with the first aspect, in a fourth possible implementation manner, the method further includes:

if the first node is the head node on the ring tunnel, after receiving the first label distribution message, learning, by the first node according to the identifier indicating that the tail node label is ready in the first label distribution message, that label allocation for all nodes on the ring tunnel except the first node is completed, and starting, by the ring tunnel, to bear the service.

In combination with the first aspect and the second, third and fourth possible implementation manners, in a fifth possible implementation manner, the first label distribution message, the second label distribution message, the third label distribution message, the fourth label distribution message, and the fifth label distribution message are all continuity check messages (CCM);

or the first label distribution message, the second label distribution message, the third label distribution message, the fourth label distribution message, and the fifth label distribution message are all connectivity verification (CV) messages;

or the first label distribution message, the second label distribution message, the third label distribution message, the fourth label distribution message, and the fifth label distribution message are all loopback messages (LBM).

In combination with the first aspect and the possible implementation manners, in a sixth possible implementation manner, that the connectivity detection between the downstream node and the first node is UP is specifically that:

the downstream node receives a connectivity detection message sent by the first node.

In a second aspect, a method for label retention in ring network protection is further provided, including:

after a ring tunnel bears a service, if a first node is an intermediate node on the ring tunnel, receiving, by the first node, a first label retention message sent by a downstream node; and if connectivity detection between the first node and the downstream node is Down, retaining, by the first node according to the first label retention message, a first label allocated by the downstream node for the ring tunnel, and after the connectivity detection between the first node and the downstream node is updated to UP, continuing to forward the service by adopting the retained first label allocated by the downstream node for the ring tunnel, where the first node and the downstream node are adjacent nodes on the ring tunnel.

In combination with the second aspect, in a first possible implementation manner, the first label retention message includes: an identifier of a tail node of the ring tunnel and an identifier of a ring bearing the ring tunnel;

after the step of receiving, by the first node, the first label retention message sent by the downstream node, the method further includes:

determining, by the first node according to the identifier of the tail node and the identifier of the ring, a ring tunnel where the downstream node is located, and storing the first label allocated by the downstream node for the ring tunnel.

In combination with the second aspect, in a second possible implementation manner, the first label retention message includes: an identifier of a ring bearing the ring tunnel;

after the step of receiving, by the first node, the first label retention message sent by the downstream node, the method further includes:

storing labels allocated by the downstream node for all ring tunnels born on the ring corresponding to the identifier of the ring.

In combination with the second aspect, in a third possible implementation manner, the method further includes:

sending, by the first node, a second label retention message to an upstream node; and when connectivity detection between the upstream node and the first node is Down, retaining, by the upstream node according to the second label retention message, a second label allocated by the first node for the ring tunnel, and after the connectivity detection between the first node and the upstream node is updated to UP, continuing to forward the service by adopting the retained second label allocated by the first node for the ring tunnel, where the first node and the upstream node are adjacent nodes on the ring tunnel.

In combination with the second aspect and the possible implementation manners, in a fourth possible implementation manner, before the step of receiving, by the first node, the first label retention message sent by the downstream node, the method further includes:

receiving, by the first node, N first label distribution messages, where the first label distribution messages are sent by the downstream node to the first node periodically, and a first label distribution message includes: the identifier of the ring bearing the ring tunnel, the identifier of the tail node of the ring tunnel, an identifier indicating that a tail node label is ready, and the first label allocated by the downstream node for the ring tunnel, where, N is a natural number.

In combination with the second aspect and the third possible implementation manner, in a fifth possible implementation manner, before the step of sending, by the first node, the second label retention message to the upstream node, the method further includes:

sending, by the first node, N second label distribution messages to the upstream node, where the second label distribution messages are sent by the first node periodically, and a second label distribution message includes: an identifier of a ring bearing the ring tunnel, an identifier of a tail node of the ring tunnel, an identifier indicating that a tail node label is ready, and the second label allocated by the first node for the ring tunnel, where, N is a natural number.

In combination with the second aspect and the third and fourth possible implementation manners, in a sixth possible implementation manner, the first label retention message, the second label retention message, and the first label distribution message are all CCMs;

or, the first label retention message, the second label retention message, and the first label distribution message are all CV messages;

or, the first label retention message, the second label retention message, and the first label distribution message are all LBMs.

In combination with the second aspect and the possible implementation manners, in a seventh possible implementation manners, the first label includes: a working tunnel label allocated by the downstream node for the ring tunnel, and the second label includes: a working tunnel label allocated by the first node for the ring tunnel;

or, the first label includes: a protection tunnel label allocated by the downstream node for the ring tunnel, and the second label includes: a protection tunnel label allocated by the first node for the ring tunnel;

or, the first label includes: a working tunnel label and a protection tunnel label allocated by the downstream node for the ring tunnel, and the second label includes: a working tunnel label and a protection tunnel label allocated by the first node for the ring tunnel.

In a third aspect, a method for label deletion in ring network protection is further provided, including:

after a first node receives a configuration message carrying change information of a ring tunnel where the first node is located, sending, by the first node according to the configuration message, a label withdraw message to an upstream node, where the label withdraw message includes: an identifier of a tail node of the ring tunnel and an identifier of a ring bearing the ring tunnel, so that the upstream node determines, according to the identifier the tail node of the ring tunnel and the identifier of the ring, the ring tunnel where the first node is located, and deletes, according to the label withdraw message, a first label allocated by the first node for the ring tunnel, where, the first node and the upstream node are adjacent nodes of the ring tunnel.

In combination with the third aspect, in a first possible implementation manner, if the upstream node is an intermediate node of the ring tunnel, the upstream node relays the label withdraw message to an upstream node of the upstream node.

In combination with the third aspect and the possible implementation manner, in a second possible implementation manner, the first label includes: a working tunnel label allocated by the first node for the ring tunnel;

or the first label includes: a working tunnel label and a protection tunnel label allocated by the first node for the ring tunnel; or the first label includes: a protection tunnel label allocated by the first node for the ring tunnel.

In a fourth aspect, a communication device is further provided, where the communication device is a physical device in ring network protection, the communication device is an intermediate node of a ring tunnel, and the communication device includes:

a detecting unit, configured to, after physical topology configuration of ring network protection is completed, detect connectivity between adjacent nodes;

a receiving unit, configured to receive a first label distribution message sent by a downstream device, where the first label distribution message includes: an identifier of a ring bearing the ring tunnel, an identifier of a tail device of the ring tunnel, an identifier indicating that a tail device label is ready, and a first label allocated by the downstream device for the ring tunnel; and a sending unit, configured to, when the first label distribution message received by the receiving unit includes the identifier indicating that the tail device label is ready, and the detecting unit detects that connectivity between the communication device and an upstream device is UP, send a second label distribution message to the upstream device, where the second label distribution message includes: the identifier of the ring bearing the ring tunnel, the identifier of the tail device of the ring tunnel, the identifier indicating that the tail device label is ready, and a second label allocated by the communication device for the ring tunnel; so that the upstream device learns, according to the identifier indicating that the tail device label is ready, that label allocation for all devices on the ring tunnel between the communication device and the tail device corresponding to the identifier of the tail device of the ring tunnel is completed, where, the upstream device and the communication device are adjacent devices on the ring tunnel, and the communication device and the downstream device are adjacent devices on the ring tunnel.

In combination with the fourth aspect, in a first possible implementation manner, the first label includes: a working tunnel label allocated by the downstream device for the ring tunnel, and the second label includes: a working tunnel label allocated by the communication device for the ring tunnel;

or, the first label includes: a protection tunnel label allocated by the downstream device for the ring tunnel, and the second label includes: a protection tunnel label allocated by the communication device for the ring tunnel;

or, the first label includes: a working tunnel label and a protection tunnel label allocated by the downstream device for the ring tunnel, and the second label includes: a working tunnel label and a protection tunnel label allocated by the communication device for the ring tunnel.

In combination with the fourth aspect, in a second possible implementation manner, if the communication device is an intermediate device on the ring tunnel, before the receiving unit receives the first label distribution message, if the detecting unit detects that the connectivity between the communication device and the upstream device is UP, the sending unit sends a third label distribution message to the upstream device, where the third label distribution message includes: the identifier of the ring bearing the ring tunnel, the identifier of the tail device of the ring tunnel, an identifier indicating that the tail device label is not ready, and the second label allocated by the communication device for the ring tunnel; so that the upstream device learns, according to the identifier indicating that the tail device label is not ready, that label allocation of one or more devices between the communication device and a tail device corresponding to the identifier of a tail device of the ring tunnel is not completed.

In combination with the fourth aspect and the second possible implementation manner, in a third possible implementation manner, the first label distribution message, the second label distribution message, and the third label distribution message are all CCMs;

or the first label distribution message, the second label distribution message, and the third label distribution message are all CV messages;

or the first label distribution message, the second label distribution message, and the third label distribution message are all LBMs.

In combination with the fourth aspect, in a fifth possible implementation manner, after the ring tunnel bears a service, the receiving unit is further configured to receive a first label retention message sent by the downstream device; and the communication device further includes:

a storage retention unit, configured to, after the receiving unit receives the first label retention message, when connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

In combination with the fourth aspect and the fifth possible implementation manner, in a sixth possible implementation manner, the first label retention message includes: the identifier of the tail device of the ring tunnel and the identifier of the ring bearing the ring tunnel;

the storage retention unit is specifically configured to, after the receiving unit receives the first label retention message, determine, according to the identifier of the tail device and the identifier of the ring, a ring tunnel where the downstream device is located, and store the first label allocated by the downstream device for the ring tunnel; and when the connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

In combination with the fourth aspect and the fifth possible implementation manner, in a seventh possible implementation manner, the first label retention message includes: the identifier of the ring bearing the ring tunnel;

the storage retention unit is specifically configured to store labels allocated by the downstream device for all ring tunnels born on the ring corresponding to the identifier of the ring; and when the connectivity detection between the communication device and the downstream device is Down, retain, according to the first label retention message, the labels allocated by the downstream device for all the ring tunnels on the ring, and after the connectivity detection between the communication device and the downstream device is updated to UP, continue to forward the service by adopting the retained labels allocated by the downstream device for all the ring tunnels on the ring.

In combination with the fourth aspect, in an eighth possible implementation manner, the receiving unit is further configured to receive a configuration message carrying change information of a ring tunnel where the communication device is located; and the sending unit is further configured to, after the receiving unit receives the configuration message, send a label withdraw message to the upstream device according to the configuration message, where the label withdraw message includes: the identifier of a tail device of the ring tunnel and the identifier of the ring bearing the ring tunnel, so that the upstream device determines, according to the identifier of the tail device of the ring tunnel and the identifier of the ring, the ring tunnel where the first device is located, and deletes, according to the label withdraw message, the second label allocated by the communication device for the ring tunnel.

It can be seen from the technical solutions that, in the method and device for label automatic allocation in ring network protection according to the embodiments of the present invention, after the connectivity connection between adjacent nodes is UP, the first node receives the first label distribution message sent by the downstream node, and the first node sends the second label distribution message to the upstream node according to the identifier indicating that the tail node label is ready in the label distribution message, so that the upstream node learns that the label allocation for all nodes on the ring tunnel between the first node and the tail node is completed; if the upstream node is not the head node on the ring tunnel, the upstream node sends the third label distribution message to the upstream adjacent node of the upstream node, until the head node on the ring tunnel learns that the label allocation for all the nodes on the ring tunnel except the head node is completed, and the ring tunnel starts to bear the service, thereby solving the problems in the prior art that the workload for configuration of the working ring is big and the availability of the end-to-end service cannot be ensured.

BRIEF DESCRIPTION OF DRAWINGS

To illustrate the technical solutions of the present invention more clearly, the following briefly describes the accompanying drawings for describing the embodiments. Apparently, the accompanying drawings in the following description show merely some embodiments of the present invention, and a person of ordinary skill in the art may still derive other drawings from these accompanying drawings without creative efforts.

FIG. 5B is a schematic flow chart of a method for label automatic allocation in ring network protection according to an embodiment of the present invention;

FIG. 6 is a schematic flow chart of a method for label automatic allocation in ring network protection according to an embodiment of the present invention;

FIG. 7 is a schematic diagram of a part of fields included in a label distribution message according to an embodiment of the present invention;

FIG. 9 is a schematic diagram of a format of a label distribution message according to another embodiment of the present invention;

FIG. 10 is a schematic flow chart of a method for label retention in ring network protection according to an embodiment of the present invention;

FIG. 11 is a schematic flow chart of a method for label retention in ring network protection according to an embodiment of the present invention;

FIG. 12 is a schematic diagram of a part of fields included in a label retention message according to an embodiment of the present invention;

FIG. 13 is a schematic diagram of a part of fields included in a label withdraw message according to an embodiment of the present invention;

DESCRIPTION OF EMBODIMENTS

Figure 1:
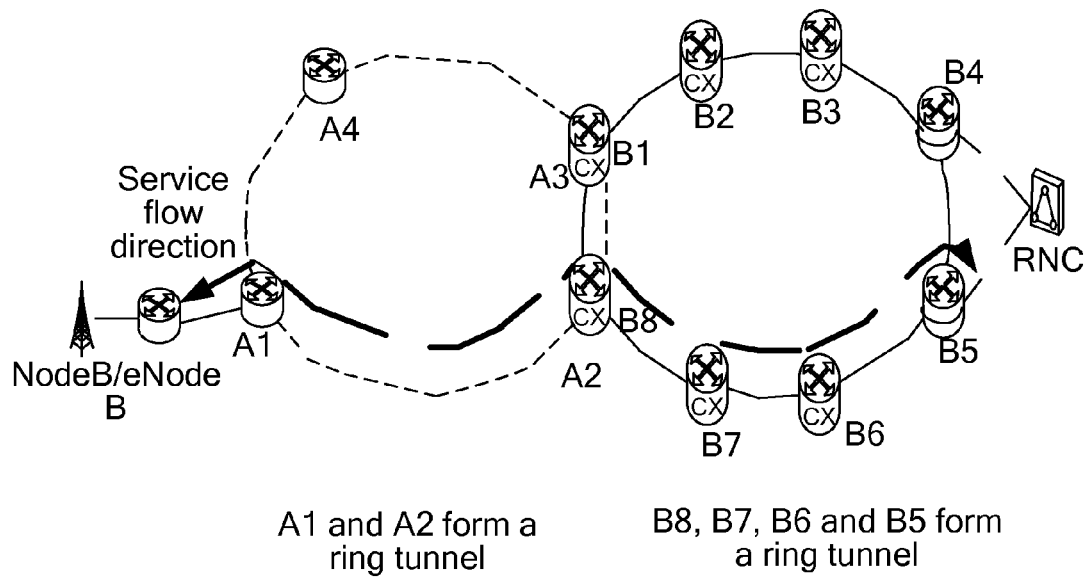
FIG. 1 is a scenario diagram of ring network protection.

To make the objectives, technical solutions, and advantages of the present invention more comprehensible, the following clearly describes the technical solutions in the embodiments of the present invention with reference to the accompanying drawings in the embodiments of the present invention. Apparently, the embodiments in the following description are merely a part of the embodiments of the present invention. Based on the following embodiments of the present invention, a person of ordinary skill in the art may obtain other embodiments which can solve the technical problem of the present invention and achieve the technical effect of the present invention, by making equivalent changes to some or all technical features and without any creative effort, where the embodiments derived from these equivalent changes evidently do not depart from the scope of the present invention.

Along with huge pressure brought by ever-increasing bandwidths, and the prosperous development of various packet switch-based services such as voice over Internet protocol (Voice over IP, VoIP for short), Internet protocol television (Internet Protocol Television; IPTV for short), layer 2 virtual private networks (Layer 2 Virtual Private Networks, L2VPN for short) and layer 3 virtual private networks (Layer 3 Virtual Private Networks, L3VPN for short), operators have to take using more statistical multiplexing packet switched networks into consideration, so as to improve the transmission efficiency as much as possible.

With the development of Transport MPLS (T-MPLS for short), interaction between the international telecommunication union telecommunication standardization sector (ITU Telecommunication Standardization Sector, ITU-T for short) and the Internet engineering task force (Internet Engineering Task Force, IETF for short) is increasing, and by means of joint-working of the ITU-T and the IETF, the existing IETF MPLS is extended by using an IETF standardization process in terms of forwarding, operation, administration and maintenance (Operation, Administration and Maintenance, OAM for short), reliability, network management, and control plane protocol, and this technique is referred to as MPLS-TP (MPLS Transport Profile). The T-MPLS standard is no longer developed, and needs to be merged into the MPLS-TP.

Protection switching refers to introducing an automatic protection switching (Automatic Protection Switching, APS for short) mechanism, which is particularly common in an optical network, into an MPLS network.

For better illustration of the embodiments of the present invention, the MPLS-TP ring network protection technique is illustrated in brief.

Ring: referring to a definition in ITU-TG.841, a closed loop constituted by a group of nodes, where each node is connected to two adjacent nodes through a bidirectional communication device. The ring network protection includes two rings that are in opposite directions and protect each other, each direction includes a working ring tunnel and a protection ring tunnel, and provides a redundant bandwidth or a redundant network device or both, so that after a network fails or deteriorates, a distributed service can recover automatically.

The MPLS-TP ring network protection is a packet ring network protection switching mode defined in an ITU-TG.8132 protocol, where a ring forwarding tunnel is constituted by using a label forwarding path, an OAM protocol is run between adjacent nodes to detect a link state, an APS is run on the ring at the same time, state notification is performed between nodes on the ring, and protection switching of the ring forwarding tunnel is completed by coordinating the nodes. An application scenario thereof is shown in FIG. 1, which can implement protection on a ring topology network, thereby protecting all service traffic on a ring network.

Figure 2:
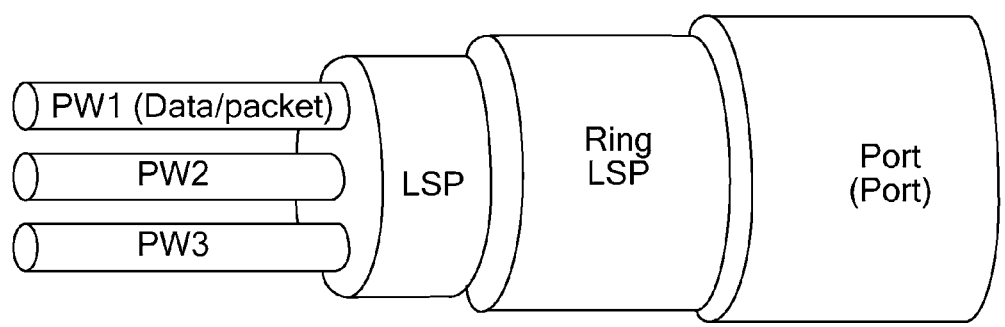
FIG. 2 is a schematic diagram of a format of service bearer in ring network protection.

The ring network protection, from the point of a forwarding behavior, forms an independent ring tunnel by configuring a working tunnel label of each node on the ring tunnel, thereby implementing bearing of a service, and implementing the protection switching based on the ring tunnel. A service encapsulation hierarchy of the ring network protection is shown in FIG. 2, and FIG. 2 shows a schematic diagram of an encapsulation hierarchy of a service (for example, a data message).

When ring network protection service configuration is performed, it is required that clockwise working tunnels and anticlockwise protection tunnels are established by using all points on the ring as off-ring nodes (that is, tail nodes), thereby implementing transmission of multiple services on one ring. A working ring is a ring structure of physical topology configuration, and there may be multiple ring tunnels on the working ring. As shown in FIG. 1, A1, A2, A3, and A4 are connected to form a working ring, that is, a ring of a physical topology structure, and the working ring may include a ring tunnel formed by A1 and A2; a ring tunnel formed by A1, A2, and A3; a ring tunnel formed by A1, A2, A3, and A4; and the like.

In the ring network protection, a ring id of 32 bits is used to identify a ring; in one ring, different nodes have different identifiers, and a node id of 8 bits is used to identify a node on the ring. In an actual application, a ring tunnel established by using each node in the ring as a destination node (that is, a tail node) may be used to bear a service.

Figure 3:
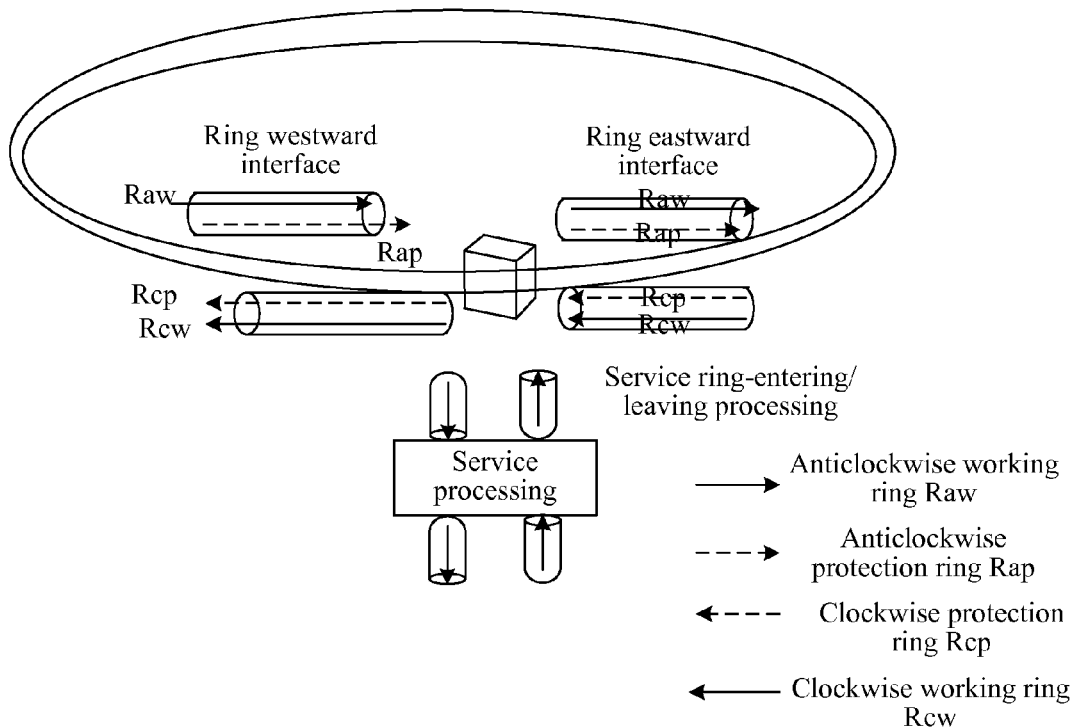
FIG. 3 is a scenario diagram of a working ring and a protection ring in ring network protection.

In addition, as shown in FIG. 3, when bearing the service, each ring tunnel may include an anticlockwise working ring tunnel (RAW), a clockwise protection ring tunnel (RCP), a clockwise working ring tunnel (RCW), and an anticlockwise protection ring tunnel (RAP). Therefore, 4 labels are required to be allocated for each node on the ring tunnel.

Figure 4:
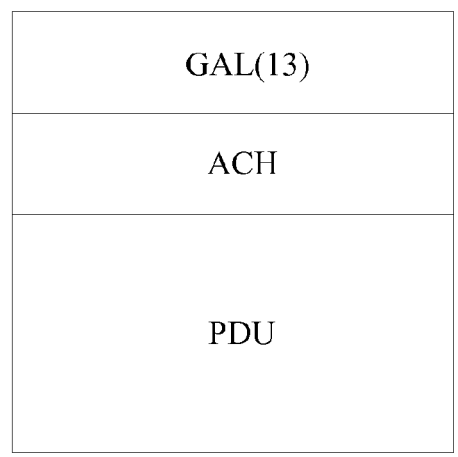
FIG. 4 is a schematic structural diagram of an existing detection message for connectivity detection.

In addition, in the ring network protection, a link failure is sensed by performing connectivity detection (that is, detection of a directly-connected link between physical ports) between adjacent nodes, and a message format used by the connectivity detection is shown in FIG. 4. It can be seen from FIG. 4 that, a message of the connectivity detection uses a fixed retention label 13, without the need of establishing a label forwarding path in advance. A connectivity detection message between the nodes of ring network protection is encapsulated by using a default label 13 of a system (the system is a system for running an MPLS protocol on the communication device), without the need of additionally allocating a label by the system, and therefore, start-up may be performed by default.

In the embodiments of the present invention, the label is automatically allocated after the connectivity detection between the adjacent nodes is UP, so as to implement label automatic allocation in the ring network protection, and therefore, after label allocation of the full path is completed, the ring network can bear the service, thereby enhancing the robustness of the service.

Figure 5A:
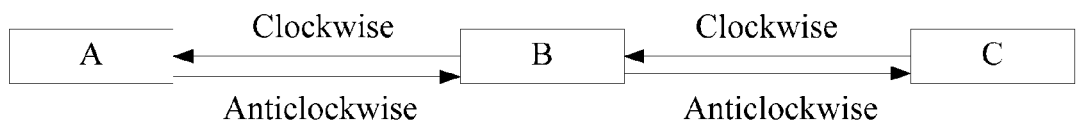
FIG. 5A is a schematic diagram of a ring tunnel in ring network protection.

FIG. 5A shows a schematic diagram of a ring tunnel in ring network protection, FIG. 5B shows a schematic flow chart of a method for label automatic allocation in ring network protection according to an embodiment of the present invention, and in combination with what is shown in FIG. 5A and FIG. 5B, the method for label automatic allocation in ring network protection in this embodiment is described as follows.

501: After physical topology configuration of a ring network is completed, test connectivity between adjacent nodes, and if a first node is an intermediate node of a ring tunnel (for example, node B in FIG. 5A), and connectivity detection between a downstream node (node C in the clockwise direction, or node A in the anticlockwise direction) and the first node (node B) is UP, the first node receives a first label distribution message sent by the downstream node, where the first label distribution message includes: an identifier of a ring bearing the ring tunnel, an identifier of a tail node of the ring tunnel, an identifier indicating that a tail node label is ready, and a first label allocated by the downstream node for the ring tunnel.

The downstream node and the first node are adjacent nodes on the ring tunnel.

The ring tunnel in this embodiment refers to a part of a working ring in the ring network protection, which enters the ring from a certain node of the working ring and exits the ring from another node of the working ring, and is not closed. In addition, the tail node is an off-ring node.

For example, the connectivity detection between the first node and the downstream node may be performed by adopting the message shown in FIG. 4. For example, if node C receives a detection message sent by node B, connectivity detection between node C and node B is UP.

502: According to the identifier indicating that the tail node label is ready in the first label distribution message, when connectivity detection between the first node and the upstream node is UP, the first node sends a second label distribution message to the upstream node, where the second label distribution message includes: the identifier of the ring bearing the ring tunnel, the identifier of the tail node of the ring tunnel, the identifier indicating that the tail node label is ready, and a second label allocated by the first node for the ring tunnel; so that the upstream node learns, according to the identifier indicating that the tail node label is ready, that label allocation of all nodes on the ring tunnel between the first node and the tail node corresponding to the identifier of the tail node of the ring tunnel is completed.

If the upstream node is not a head node of the ring tunnel, according to the identifier indicating that the tail node label is ready in the second label distribution message, when connectivity detection between the upstream node and a second node is UP, the upstream node sends a third label distribution message to the second node, until the head node on the ring tunnel receives a fourth label distribution message sent by a downstream adjacent node of the head node on the ring tunnel, and learns, according to the identifier indicating that the tail node label is ready in the fourth label distribution message, that label allocation of all nodes on the ring tunnel except the head node is completed, and the ring tunnel starts to bear a service.

The second node is an adjacent upstream node of the upstream node on the ring tunnel, and the first node and the upstream node are adjacent nodes on the ring tunnel.

For example, if the first node does not send a label distribution message to the upstream node, the second label included in the second label distribution message is a second label allocated by the first node for the ring tunnel.

If the first node, before receiving the first label distribution message, has sent a label distribution message to the upstream node (a fifth label distribution message described as follows), the second label included in the second label distribution message is a label carried in the fifth label distribution message and allocated for the ring tunnel by the first node.

For another example, in step 501 and step 502, the first label includes: a working tunnel label allocated by the downstream node for the ring tunnel, and the second label includes: a working tunnel label allocated by the first node for the ring tunnel;

or, the first label includes: a protection tunnel label allocated by the downstream node for the ring tunnel, and the second label includes: a protection tunnel label allocated by the first node for the ring tunnel;

or, the first label includes: a working tunnel label and a protection tunnel label allocated by the downstream node for the ring tunnel, and the second label includes: a working tunnel label and a protection tunnel label allocated by the first node for the ring tunnel.

That is to say, in a label automatic allocation manner of ring network protection, if a certain label distribution message includes a working tunnel label, every label distribution message between nodes in the ring tunnel includes a working tunnel label.

Correspondingly, if a certain label distribution message includes a protection tunnel label, every label distribution message between nodes in the ring tunnel includes a protection tunnel label.

If a certain label distribution message includes a protection tunnel label and a working tunnel label, every label distribution message between nodes in the ring tunnel includes a protection tunnel label and a working tunnel label.

It can be seen from the embodiment that, in the method for label automatic allocation in ring network protection of this embodiment, by receiving the first label distribution message sent by the downstream node after the connectivity detection between the adjacent nodes is UP, and then sending the second label distribution message to the upstream node according to the identifier indicating that the tail node label is ready in the label distribution message, the upstream node is enabled to learn that the label allocation for all the nodes on the ring tunnel between the first node and the tail node is completed; if the upstream node is not the head node on the ring tunnel, the upstream node sends the third label distribution message to the upstream adjacent node of the upstream node, until the head node on the ring tunnel learns that the label allocation for all the nodes on the ring tunnel except the head node is completed, thereby solving problems in the prior art that a workload for configuration of a working ring is big and availability of an end-to-end service cannot be ensured.

In an optional application scenario, in the method for label automatic allocation in ring network protection shown in FIG. 5, before the step of receiving the first label distribution message sent by the downstream node in step 501, the method for label automatic allocation in ring network protection further includes step 501a shown in FIG. 6.

501a: If the connectivity detection between the first node and the upstream node is UP, the first node sends a fifth label distribution message to the upstream node, where the fifth label distribution message includes: the identifier of the ring bearing the ring tunnel, the identifier of the tail node of the ring tunnel, an identifier indicating that the tail node label is not ready, and the second label allocated by the first node for the ring tunnel; so that the upstream node learns, according to the identifier indicating that the tail node label is not ready, that label allocation for one or more nodes between the first node and the tail node corresponding to the identifier of the tail node of the ring tunnel is not completed. That is to say, the upstream node learns that the label allocation of the ring tunnel is not completed yet, and the ring tunnel cannot bear a service.

It can be seen from the embodiment that, the method for label automatic allocation in ring network protection of this embodiment can solve the problems in the prior art that a workload for configuration of a working ring is big and availability of an end-to-end service cannot be ensured.

Optionally, in another optional application scenario, the method for label automatic allocation in ring network protection includes:

S01: After the physical topology configuration of ring network protection is completed, test connectivity between adjacent nodes, and if the first node is a tail node of the ring tunnel (if the ring tunnel is a clockwise working ring, the tail node may be node A in FIG. 5A), and connectivity detection between the first node (node A) and the upstream node (node B) is UP, the first node sends the second label distribution message to the upstream node, where the second label distribution message includes: the identifier of the ring bearing the ring tunnel, the identifier of the tail node of the ring tunnel, the identifier indicating that the tail node label is ready, and the second label allocated by the first node for the ring tunnel.

Definitely, if the ring tunnel is an anticlockwise working ring, the tail node may be node C in FIG. 5A, and in this case, the upstream node of node C is node B.

In a third optional application scenario, the method for label automatic allocation in ring network protection includes:

S01': After the physical topology configuration of ring network protection is completed, test connectivity between adjacent nodes, and if the first node is the head node of the ring tunnel (if the ring tunnel is an anticlockwise working ring, the head node may be node A in FIG. 5A), and connectivity detection between the downstream node (node B) and the first node (node A) is UP, the first node receives the first label distribution message sent by the downstream node, where the first label distribution message includes: the identifier of the ring bearing the ring tunnel, the identifier of the tail node of the ring tunnel, the identifier indicating that the tail node label is ready, and the first label allocated by the first node for the ring tunnel; after receiving the first label distribution message, the first node learns, according to the identifier indicating that the tail node label is ready, that label allocation for all nodes on the ring tunnel except the first node is completed, and the ring tunnel starts to bear a service.

Definitely, if the ring tunnel is a clockwise working ring, the head node may be node C in FIG. 5A, and in this case, node A is a destination node, that is, a tail node, and the downstream node of node A is node B.

It should be understood that, in any embodiment, that the connectivity detection between the downstream node and the first node is UP, for example, may specifically be that: the first node receives a message of connectivity detection sent by the downstream node, or, the downstream node receives a message of connectivity detection sent by the first node; and therefore, the first node may consider that a link between the first node and the adjacent downstream node is up, so a state of the connectivity detection is set to UP.

Correspondingly, that the connectivity detection between the first node and the upstream node is UP, for example, may specifically be that: the first node receives a message of connectivity detection sent by the upstream node, or, the upstream node receives a message of connectivity detection sent by the first node; and therefore, the first node may consider that a link between the first node and the adjacent upstream node is up, so a state of the connectivity detection is set to UP.

It should be noted that, every ring tunnel in the ring network protection has an anticlockwise protection ring and a clockwise working ring, or has a clockwise protection ring and an anticlockwise working ring. Therefore, the upstream node and the first node are relative concepts; the downstream node and the first node are relative concepts as well.

For example, the upstream node may be an upstream node on a clockwise working ring where the first node is located, and the downstream node may be a downstream node on the clockwise working ring where the first node is located;

or, the upstream node may be an upstream node on an anticlockwise protection ring where the first node is located; and the downstream node may be a downstream node on the anticlockwise protection ring where the first node is located.

In an optional application scenario, if the ring is a closed ring (A-B-C-D-E-A), the ring has multiple ring tunnels (such as a first ring tunnel ABC, a second ring tunnel CDE, a third ring tunnel DEA, and a fourth ring tunnel ABCDE). In this case, a head node C on a first ring tunnel may be a tail node on a second ring tunnel, and each node on the whole ring may allocate a working tunnel label and/or protection tunnel label for a ring tunnel of the node. In an actual application, each node allocates one working tunnel label and/or one protection tunnel label for all ring tunnels, and in this case, the ring tunnels are distinguished only by identifiers of tail nodes, for example, a working tunnel label allocated by A for the first ring tunnel is also a working tunnel label allocated by A for the fourth ring tunnel. If the ring tunnels on the ring are overlapped crosswise, each node on the ring is allocated a working tunnel label and/or a protection tunnel label.

Figure 8:
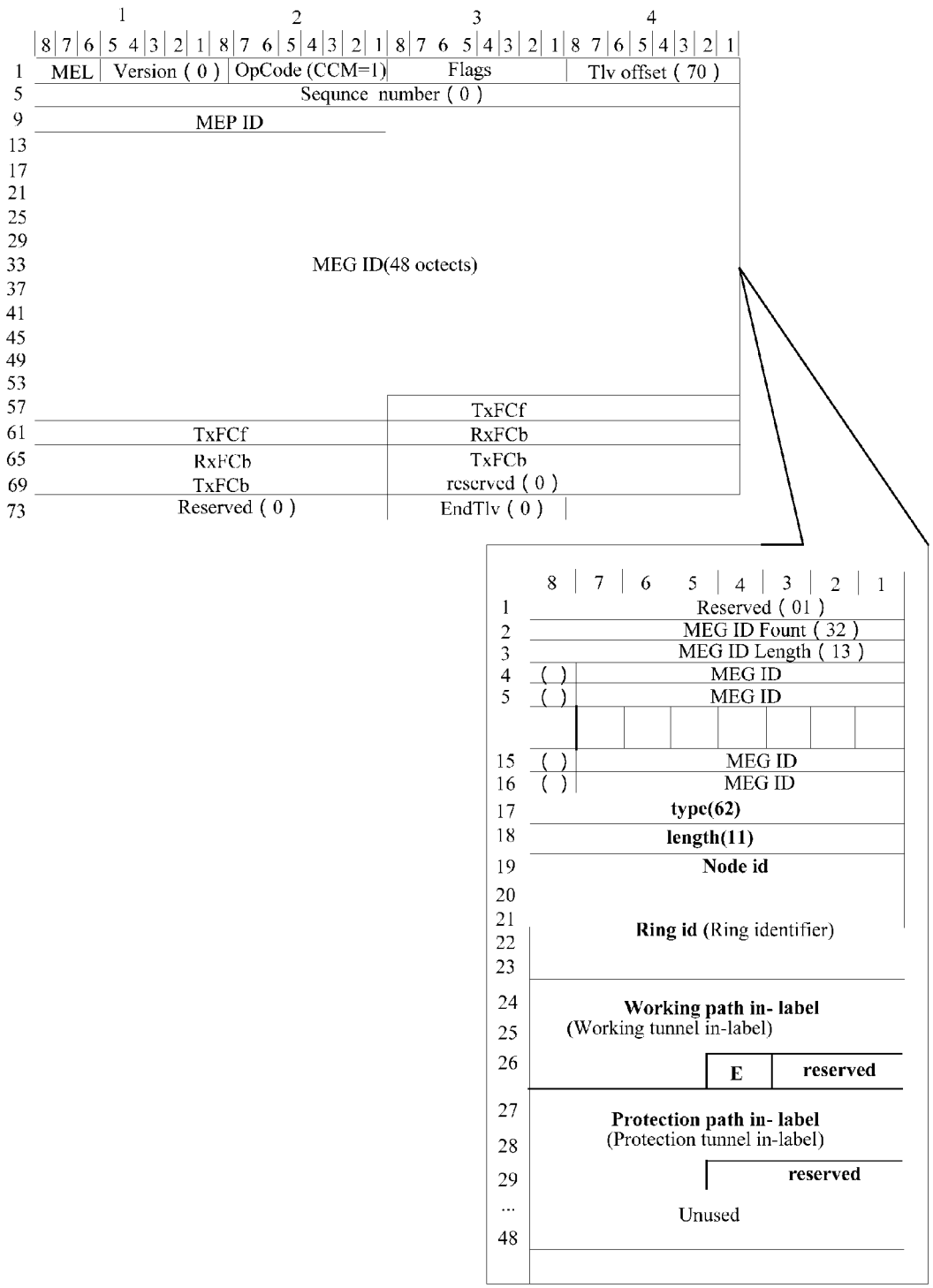
FIG. 8 is a schematic diagram of a format of a label distribution message according to an embodiment of the present invention.

For better illustration of the label distribution message, a part or all of fields in the label distribution message are illustrated through examples as follows. As shown in FIG. 7, FIG. 8, and FIG. 9, FIG. 7 shows a schematic diagram of a part of fields in a label distribution message according to an embodiment of the present invention, FIG. 8 shows a schematic diagram of a format of a label distribution message according to an embodiment of the present invention, and FIG. 9 shows a schematic diagram of a format of a label distribution message according to another embodiment of the present invention.

It should be noted that, the first label distribution message, the second label distribution message, the third label distribution message, the fourth label distribution message, and the fifth label distribution message in any embodiment need to include fields shown in FIG. 7, which are specifically:

Type (8 bits): label distribution, having a value fixed to be 62;

Length (8 bits): message length, having a value fixed to be 11;

Node id (8 bits): an identifier of an off-ring node (that is, an identifier of a tail node in a ring tunnel);

ring id (32 bits): an identifier of a ring (that is, an identifier of a ring bearing a ring tunnel);

Working path in-label (20 bits): a working tunnel label allocated by a current node for the ring tunnel (that is, a working tunnel in-label of the current node);

Protection path in-label (20 bits): a protection tunnel label allocated by the current node for the ring tunnel (that is, a protection tunnel in-label of the current node); and E bit (1 bit): an identifier indicating whether a tail node label is ready; for example, E=0 is an identifier indicating that a tail node label is not ready, and E=1 is an identifier indicating that a tail node label is ready.

In this embodiment, the identifier indicating whether a tail node label is ready refers to: whether labels of all nodes (including the tail node) in the ring tunnel between the node currently distributing the label distribution message and the tail node are ready;

if E=1, it is indicated that labels of all nodes (including the tail node) in the ring tunnel between the node currently distributing the label distribution message and the tail node are ready;

if E=0, it is indicated that labels of one or more nodes in all nodes (including the tail node) in the ring tunnel between the node currently distributing the label distribution message and the tail node are not ready.

For example, the first label distribution message, the second label distribution message, the third label distribution message, the fourth label distribution message, and the fifth label distribution message may all be continuity check messages (Continuity Check Message, CCM for short), where a CCM here may be a CCM obtained after extending a CCM defined by an ITU-T Y.1731 protocol.

Specifically, the last 32 bytes of a meg id field in a CCM defined by the existing ITU-T Y.1731 protocol are not used. As shown in FIG. 8, FIG. 8 shows an extended CCM, in this embodiment, the last 32 bytes of the meg id field in the CCM of the existing protocol are extended, and boldfaced parts in FIG. 8 are fields shown in FIG. 7. In the method for label automatic allocation in ring network protection of this embodiment, if the CCM shown in FIG. 8 is adopted for the first label distribution message, the second label distribution message, the third label distribution message, the fourth label distribution message, and the fifth label distribution message, the whole bandwidth is saved while label automatic allocation of the ring network is implemented.

In another application scenario, the extended CCM may be as that shown in FIG. 9, the foregoing fields, namely, Type (8 bits), Length (8 bits), Node id (8 bits), ring id (32 bits), Working path in-label (20 bits), Protection path in-label (20 bits), and E bit (1 bit), are placed at the last part of the CCM defined by the existing ITU-T Y.1731 protocol, as shown in the boldfaced fields in FIG. 9.

In combination with what is shown in FIG. 5A and FIG. 9, in FIG. 5A, node A is a head node, and node C is a tail node. The method for label automatic allocation in ring network protection may include the following step M01 to step M04.

M01: After physical topology configuration of ring network protection is completed, and after connectivity detection between node B and node A is UP, node B sends a fifth CCM to node A, where the fifth CCM includes: a ring id, a Node C id, E=0, a Working path in-label (B), and a Protection path in-label (B).

M02: After receiving the fifth CCM sent by node B, node A determines, according to E=0, that label allocation for one or more nodes between node B and node C is not completed, and a ring tunnel where node A is located cannot bear a service.

M03: If connectivity detection between node B and node C is UP, node B receives a first CCM sent by node C, where the first CCM includes: the ring id, the Node C id, E=1, a Working path in-label (C), and a Protection path in-label (C).

M04: After receiving the first CCM sent by the node C, node B determines, according to E=1, that label allocation for the tail node C is completed, and in this case, if the connectivity detection between node B and node A is UP, node B sends a second CCM to node A, where the second CCM includes: the ring id, the Node C id, E=1, the Working path in-label (B), and the Protection path in-label (B).

When node B is not a head node, it can be deduced by analog that, node B sends a third CCM to node A, and after the head node A receives the third CCM sent by node B and including an E bit being 1, it is considered that label allocation for ring tunnels of all nodes between node B and the tail node C is completed, and a control plane of the head node A may set the ring tunnel to UP, so as to be used to bear a service.

In another embodiment, the first label distribution message, the second label distribution message, the third label distribution message, the fourth label distribution message, and the fifth label distribution message may also be connectivity verification (Connectivity Verification, CV for short) messages, for example, a CV message here may be a message obtained after extending a CV message defined by the IETF RFC6428 protocol, which is not shown in the drawing of this embodiment.

In addition, it should be noted that, in the method for label automatic allocation in the embodiment, the label automatic distribution is implemented based on connectivity detection that automatically sending a packet, so that the configuration is simple. In an actual application, slight modification may be made on processing logic of hardware, so as to implement the label automatic allocation in ring network protection.

Optionally, the first label distribution message, the second label distribution message, the third label distribution message, the fourth label distribution message, and the fifth label distribution message may also be loopback message (LoopBack Message, LBM for short) (for example, an LBM obtained after extending the LBM defined by the ITU-T Y.1731 protocol), and in this case, the label allocation of the ring tunnel may be performed according to a requirement of a user. In an actual application, the label automatic allocation may be implemented by modifying software in a physical topology node.

FIG. 10 shows a schematic flow chart of a method for label retention in ring network protection, and as show in FIG. 10, the method for label retention in ring network protection in this embodiment is described as follows.

1001: After a ring tunnel bears a service, if a first node is an intermediate node on the ring tunnel, the first node receives a first label retention message sent by a downstream node.

1002: If connectivity detection between the first node and the downstream node is Down, the first node retains, according to the first label retention message, a first label allocated by the downstream node for the ring tunnel, and after the connectivity detection between the first node and the downstream node is updated to UP, continues to forward the service by adopting the retained first label allocated by the downstream node for the ring tunnel, where the first node and the downstream node are adjacent nodes on the ring tunnel.

The method for label retention in ring network protection of this embodiment enables the ring tunnel, after the connectivity detection between the adjacent nodes being Down is updated to UP, to continue to forward the service by adopting the retained first label allocated by the downstream node for the ring tunnel, so that it is unnecessary to reallocate a working tunnel label, thereby simplifying a problem of a big label configuration workload in the existing working ring.

For example, the first label includes: a working tunnel label allocated by the downstream node for the ring tunnel, or, a protection tunnel label allocated by the downstream node for the ring tunnel, or, a working tunnel label and a protection tunnel label allocated by the downstream node for the ring tunnel.

In an optional application scenario, the first label retention message includes: an identifier of a tail node of the ring tunnel and an identifier of a ring bearing the ring tunnel, and therefore, after the step of receiving, by the first node, the first label retention message sent by the downstream node in step 1001, the method for label retention in ring network protection further includes:

1002': The first node determines, according to the identifier of the tail node and the identifier of the ring, a ring tunnel where the downstream node is located, and stores a first label allocated by the downstream node for the ring tunnel.

In an actual application, the first label retention message may include an identifier of a ring bearing the ring tunnel, and therefore, after the step of receiving, by the first node, the first label retention message sent by the downstream node in step 1001, the method for label retention in ring network protection further includes 1002" as follows which is not shown in the drawing:

1002": Store labels allocated by the downstream node for all ring tunnels on the ring corresponding to the identifier of the ring.

It can be understood that, the first node stores working tunnel labels allocated by the downstream node for all the ring tunnels, and therefore, when the connectivity detection between the downstream node and the first node is Down, the first node may label-retain labels allocated by the downstream node for all the ring tunnels, and after the connectivity detection between the first node and the downstream node is updated to UP, continue to forward the service by adopting the labels allocated by the downstream node for all the ring tunnels.

In this embodiment, the downstream node may be a downstream node on a clockwise working ring where the first node is located;

or, the downstream node may be a downstream node on an anticlockwise protection ring where the first node is located.

In another application scenario, after step 1002, the method for label retention in ring network protection further includes step 1003 which is not shown in the drawing:

1003: The first node sends a second label retention message to an upstream node; and when connectivity detection between the upstream node and the first node is Down, the upstream node retains, according to the second label retention message, a second label allocated by the first node for the ring tunnel, and after the connectivity detection between the first node and the upstream node is updated to UP, continues to forward the service by adopting the retained second label allocated by the first node for the ring tunnel.

For example, the second label retention message includes: an identifier of a tail node and an identifier of a ring bearing the ring tunnel. In this case, after receiving the second label retention message, the upstream node determines, according to the identifier of the tail node and the identifier of the ring, the ring tunnel where the first node is located, and stores the second label allocated by the first node for the ring tunnel.

Alternatively, the second label retention message includes: an identifier bearing the ring tunnel (as shown in FIG. 12). In this case, after receiving the second label retention message, the upstream node stores second labels allocated by the first node for all ring tunnels on the ring.

In this step, the first node and the upstream node are adjacent nodes on the ring tunnel.

In this embodiment, the upstream node may be an upstream node on a clockwise working ring where the first node is located, or, the upstream node may be an upstream node on an anticlockwise protection ring where the first node is located.

In addition, the first label includes: a working tunnel label allocated by the downstream node for the ring tunnel, and the second label includes: a working tunnel label allocated by the first node for the ring tunnel; or the first label includes: a protection tunnel label allocated by the downstream node for the ring tunnel, and the second label includes: a protection tunnel label allocated by the first node for the ring tunnel; or the first label includes: a working tunnel label and a protection tunnel label allocated by the downstream node for the ring tunnel, and the second label includes: a working tunnel label and a protection tunnel label allocated by the first node for the ring tunnel.

It can be understood that, in an optional application scenario, if the ring is a closed ring (A-B-C-D-E-A in the drawing), the ring has multiple ring tunnels (such as a first ring tunnel ABC, a second ring tunnel CDE, a third ring tunnel DEA, and a fourth ring tunnel ABCDE), all ring tunnels on the ring start to bear services, and a downstream node A between adjacent nodes may send the label retention message to the adjacent upstream node B, so that the upstream node retains, according to the label retention message, working tunnel labels and/or protection tunnel labels allocated by the downstream node A for all the ring tunnels when connectivity detection between the downstream node A and the upstream node B is Down.

The method for label retention in ring network protection in this embodiment may simplify a problem of a big workload of the existing label configuration, and does not increase the network load.

FIG. 11 shows a schematic flow chart of a method for label retention in ring network protection, and as show in FIG. 11, the method for label retention in ring network protection in this embodiment is described as follows.

1101: After a ring tunnel bears a service, if a first node is an intermediate node on the ring tunnel, the first node receives N first label distribution messages, where the first label distribution messages are sent by the downstream node to the first node periodically, and the first label distribution message includes: an identifier of a ring bearing the ring tunnel, an identifier of a tail node of the ring tunnel, an identifier indicating that a tail node label is ready, and a first label allocated by the downstream node for the ring tunnel.

For example, the first label may be a working tunnel label, a protection tunnel label, or a working tunnel label and a protection tunnel label allocated by the downstream node for the ring tunnel.

N is a natural number, for example, N may be 5, 8, 10, 12, and the like.

1102: The first node, after continuously receiving N first label distribution messages, receives a first label retention message sent by a downstream node, where the first label retention message includes: the identifier of the tail node and the identifier of the ring bearing the ring tunnel.

1103: If connectivity detection between the first node and the downstream node is Down, the first node retains, according to the first label retention message, the first label allocated by the downstream node for the ring tunnel, and after the connectivity detection between the first node and the downstream node is updated to UP, continues to forward the service by adopting the retained first label allocated by the downstream node for the ring tunnel, where the first node and the downstream node are adjacent nodes on the ring tunnel.

If N first label distribution message in step 1101 each include: the identifier of the ring bearing the ring tunnel, the identifier of the tail node of the ring tunnel, the identifier indicating that the tail node label is ready, and a working tunnel label allocated by the downstream node for the ring tunnel, in step 1103, the first node may retain, according to the first label retention message, the working tunnel label allocated by the downstream node for the ring tunnel.

The relationship between the first node and an upstream node similar to that described in step 1101 to step 1103 is described as follows:

1104: After the ring tunnel bears the service, if the first node is an intermediate node on the ring tunnel, the first node sends N second label distribution messages to the upstream node, where the second label distribution messages are sent by the first node periodically, and the second label distribution message includes: the identifier of the ring bearing the ring tunnel, the identifier of the tail node of the ring tunnel, the identifier indicating that the tail node label is ready, and a second label allocated by the first node for the ring tunnel, where N is a natural number, and its value may be 2, 3, 5, 10, and the like; the value of N is not limited in this embodiment.

1105: The first node, after sending N continuous second label distribution messages, sends a second label retention message to the upstream node, where the second label retention message includes: the identifier of the tail node and the identifier of the ring bearing the ring tunnel; and when connectivity detection between the first node and the upstream node is Down, the upstream node retains, according to the second label retention message, a second label allocated by the first node for the ring tunnel, and after the connectivity detection between the first node and the upstream node is updated to UP, continues to forward the service by adopting the retained second label allocated by the first node for the ring tunnel, where the first node and the upstream node are adjacent nodes on the ring tunnel.

If N second label distribution messages in step 1104 each include: the identifier of the ring bearing the ring tunnel, the identifier of the tail node of the ring tunnel, the identifier indicating that the tail node label is ready, and a working tunnel label allocated by the first node for the ring tunnel, in step 1105, the upstream node retains, according to the second label retention message, the working tunnel label allocated by the first node for the ring tunnel.

For example, in step 1101 and step 1104, adjacent nodes including a label distribution message having an E bit being 1 lasts for 10 cycles. If in the 10 cycles, the connectivity detection between the first node and the upstream node/downstream node is interrupted, it is required that, after the connectivity detection is updated to UP, the label distribution message is continuously sent for 10 cycles.

If the connectivity detection keeps being UP during the 10 cycles, it is indicated that the upstream node correctly receives a label distribution message including an E bit being 1, and a label forwarding path is established; after that, a CCM for communications between adjacent nodes carries a label retention message, indicating that the label forwarding path is established, even connectivity detection interruption occurs subsequently, a previously allocated label can be used continuously without the need of restarting a label distribution procedure.

It can be understood that, the node in label retention state may store a label relationship (for example, the working tunnel label), for example, store the label relationship in a manner of writing a configuration file.

Definitely, in an actual application, the label relationship is not only stored in a memory of a communication device, and can be stored in another place, so that the label relationship of the node can still be stored after reboot, and forwarding may be performed continuously.

For example, step 1101 to step 1103 and step 1104 to step 1105 may be performed in parallel without precedence.

In this embodiment, the first label retention message, the second label retention message, the first label distribution message, and the second label distribution message may all be CCMs, CV messages, or LBMs, where, the first label retention message and the second label retention message need to include fields shown in FIG. 12:

Type (8 bits): label retention, having a value fixed to be 63;

Length (8 bits): message length, having a value fixed to be 0; and ring id (32 bits): an identifier of a ring (that is, an identifier of a ring bearing the ring tunnel).

In other words, the CCM may be obtained by extending a CCM in the existing protocol, and the extended CCM may include the foregoing fields, such as, Type (8 bits), Length (8 bits), and ring id (32 bits), which are not shown in this embodiment.

Correspondingly, the CV message may be obtained by extending a CV message in the existing protocol, and the extended CV message may include the foregoing fields, such as Type (8 bits), Length (8 bits), and ring id (32 bits).

The LBM may be obtained by extending an LBM in the existing protocol, and the extended LBM may include the foregoing fields, such as Type (8 bits), Length (8 bits), and ring id (32 bits).

This embodiment is only used as an example for illustrating that any message capable of bearing the label retention message or label distribution message can be used.

An embodiment of the present invention provides a method for label deletion in ring network protection, and the method for label deletion in ring network protection in this embodiment is described as follows.

P01: After a first node receives a configuration message carrying change information of a ring tunnel where the first node is located, the first node sends, according to the configuration message, a label withdraw message to an upstream node, where the label withdraw message includes: an identifier of a tail node of the ring tunnel and an identifier of a ring bearing the ring tunnel, so that the upstream node determines, according to the identifier of the tail node of the ring tunnel and the identifier of the ring, the ring tunnel where the first node is located, and deletes, according to the label withdraw message, a first label allocated by the first node for the ring tunnel, where, the first node and the upstream node are adjacent nodes of the ring tunnel.

For example, the first label includes: a working tunnel label allocated by the first node for the ring tunnel; or, the first label includes: a working tunnel label and a protection tunnel label allocated by the first node for the ring tunnel; or, the first label includes: a protection tunnel label allocated by the first node for the ring tunnel.

Further, if the upstream node is an intermediate node of the ring tunnel, the upstream node relays the label withdraw message to an upstream node of the upstream node.

In an actual application, that the node sends the label withdraw message may be applied to the following scenarios:

(1) A certain node in ring network configuration is deleted. The node needs to send, before configuration is deleted, the label withdraw message to an upstream node on a ring tunnel where the node is located, so as to withdraw a previously allocated label and remove the ring tunnel, so that the ring tunnel is no longer used to bear a service.

(2) The physical topology of the ring is changed, that is, a physical node is added or replaced. Before configuration is deleted, one or more nodes on the original ring tunnel send a label withdraw message to an upstream node, so as to withdraw a previously allocated label and remove the ring tunnel, so that the ring tunnel is no longer used to bear a service.

In the forgoing example, the upstream node is an upstream node on a clockwise working ring where the first node is located; or, the upstream node is an upstream node on an anticlockwise protection ring where the first node is located.

For example, the label withdraw message may be obtained by extending a CCM in the existing protocol, or by extending a CV message in the existing protocol, or, by extending an LBM in the existing protocol. Particularly, the extended CCM, CV message or LBM may include the following fields, as shown in FIG. 13:

Type (8 bits): label withdrawal, having a value fixed to be 64;

Length (8 bits): message length, having a value fixed to be 5;

Node id (8 bits): an identifier of an off-ring node; and ring id (32 bits): an identifier of the ring.

The method for label deletion in ring network protection in this embodiment may implement automatic deletion of a label, without the need of manual configuration for deleting a label of an original ring tunnel, thereby reducing the burden of a communication device at the same time.

Figure 14:
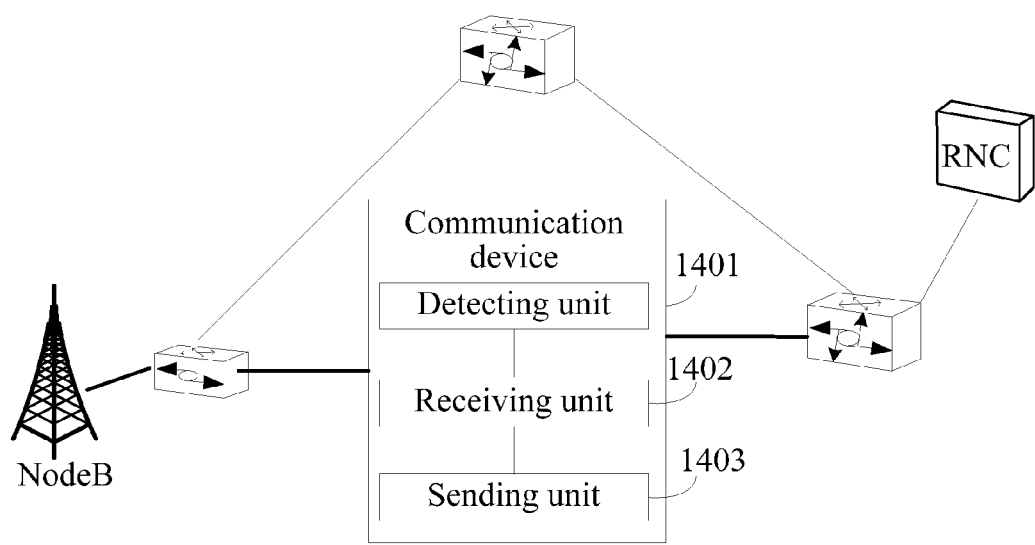
FIG. 14 is a schematic structural diagram of a communication device according to an embodiment of the present invention.

An embodiment of the present invention further provides a communication device, as shown in FIG. 14, the communication device is a physical device in the ring network protection, and the communication device is an intermediate node of a ring tunnel on a ring. The communication device includes: a detecting unit 1401, a receiving unit 1402, and a sending unit 1403, where the detecting unit 1401 is configured to, after physical topology configuration of ring network protection is completed, detect connectivity between adjacent nodes;

the receiving unit 1402 is configured to receive a first label distribution message sent by the downstream device, where the first label distribution message includes: an identifier of a ring bearing a ring tunnel, an identifier of a tail device of the ring tunnel, an identifier indicating that a tail device label is ready, and a first label allocated by the downstream device for the ring tunnel; and the sending unit 1403 is configured to, when the first label distribution message received by the receiving unit includes the identifier indicating that the tail device label is ready, and the detecting unit 1401 detects that connectivity between the communication device and an upstream device is UP, send a second label distribution message to the upstream device, where the second label distribution message includes: the identifier of the ring bearing the ring tunnel, the identifier of the tail device of the ring tunnel, the identifier indicating that the tail device label is ready, and a second label allocated by the communication device for the ring tunnel; so that the upstream device learns, according to the identifier indicating that the tail device label is ready, that label allocation for all devices on the ring tunnel between the communication device and the tail device corresponding to the identifier of the tail device of the ring tunnel is completed, where, the upstream device and the communication device are adjacent devices on the ring tunnel, and the communication device and the downstream device are adjacent devices on the ring tunnel.

If the upstream device is not a head device on the ring tunnel, the upstream device sends, according to the identifier indicating that the tail device label is ready in the second label distribution message, a third label distribution message to another communication device when connectivity detection between the upstream device and the another communication device is UP, until the head device on the ring tunnel receives a fourth label distribution message sent by a downstream adjacent communication device of the head device on the ring tunnel, and learns, according to the identifier indicating that the tail device label is ready in the fourth label distribution message, that label allocation for all communication devices on the ring tunnel except the head device is completed, and the ring tunnel starts to bear a service, where, the another communication device is an adjacent upstream device of the upstream device on the ring tunnel.

For example, the first label includes: a working tunnel label allocated by the downstream device for the ring tunnel, and the second label includes: a working tunnel label allocated by the communication device for the ring tunnel; or the first label includes: a protection tunnel label allocated by the downstream device for the ring tunnel, and the second label includes: a protection tunnel label allocated by the communication device for the ring tunnel; or the first label includes: a working tunnel label and a protection tunnel label allocated by the downstream device for the ring tunnel, and the second label includes: a working tunnel label and a protection tunnel label allocated by the communication device for the ring tunnel.

Further, if the communication device is an intermediate device on the ring tunnel, before the receiving unit receives the first label distribution message, if the detecting unit detects that connectivity between the communication device and the upstream device is UP, the sending unit sends a third label distribution message to the upstream device, where the third label distribution message includes: the identifier of the ring bearing the ring tunnel, the identifier of the tail device of the ring tunnel, an identifier indicating that the tail device label is not ready, and the second label allocated by the communication device for the ring tunnel; so that the upstream device learns, according to the identifier indicating that the tail device label is not ready, that label allocation for one or more devices between the communication device and the tail device corresponding to the identifier of the tail device of the ring tunnel is not completed.

For example, the first label distribution message, the second label distribution message, and the third label distribution message may be CCMs obtained by extending a CCM defined by the ITU-T Y.1731 protocol; for example, the extended CCM may include the foregoing exemplary fields, such as Type (8 bits), Length (8 bits), Node id (8 bits), and ring id (32 bits).

Alternatively, the first label distribution message, the second label distribution message, and the third label distribution message may be CV messages obtained by extending a CV message defined by the IETF RFC6428 protocol; for example, the extended CV message may include the foregoing exemplary fields, such as Type (8 bits), Length (8 bits), Node id (8 bits), and ring id (32 bits).

Alternatively, the first label distribution message, the second label distribution message, and the third label distribution message may be LBMs obtained by extending an LBM defined by the ITU-T Y.1731 protocol; for example, the extended LBM may include the foregoing exemplary fields, such as Type (8 bits), Length (8 bits), Node id (8 bits), and ring id (32 bits).

In another application scenario, after the ring tunnel bears the service, the receiving unit 1402 is further configured to receive a first label retention message sent by the downstream device; in this case, the communication device further includes a storage retention unit which is not shown in the drawing, where, the storage retention unit is configured to, after the receiving unit receives the first label retention message, and when the connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

For example, after the ring tunnel bears the service, the receiving unit is further configured to receive the first label retention message sent by the downstream device, where the first label retention message includes: the identifier of the tail device of the ring tunnel and the identifier of the ring bearing the ring tunnel;

the storage retention unit is specifically configured to, after the receiving unit receives the first label retention message, determine, according to the identifier of the tail device and the identifier of the ring, a ring tunnel where the downstream device is located, and store the first label allocated by the downstream device for the ring tunnel; and when the connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

Alternatively, in an actual application, the receiving unit is further configured to receive the first label retention message sent by the downstream device, where the first label retention message includes: the identifier of the ring bearing the ring tunnel;

the storage retention unit is specifically configured to store labels allocated by the downstream device for all ring tunnels born on the ring corresponding to the identifier of the ring; and in this case, when the connectivity detection between the communication device and the downstream device is Down, retain, according to the first label retention message, the labels allocated by the downstream device for all ring tunnels on the ring, and after the connectivity detection between the communication device and the downstream device is updated to UP, continue to forward the service by adopting the retained labels allocated by the downstream device for all ring tunnels.

In another application scenario, for example, the receiving unit 1402 is further configured to receive a configuration message carrying change information of a ring tunnel where the communication device is located; and the sending unit 1403 is configured to, after the receiving unit 1402 receives the configuration message, send a label withdraw message to the upstream device according to the configuration message, where the label withdraw message includes: the identifier of the tail device of the ring tunnel and the identifier of the ring bearing the ring tunnel, so that the upstream device determines, according to the identifier of the tail device of the ring tunnel and the identifier of the ring, a ring tunnel where the communication device is located, and deletes, according to the label withdraw message, the second label allocated by the communication device for the ring tunnel.

For example, the first label includes: a working tunnel label allocated by the downstream device for the ring tunnel, and the second label includes: a working tunnel label allocated by the communication device for the ring tunnel; or the first label includes: a protection tunnel label allocated by the downstream device for the ring tunnel, and the second label includes: a protection tunnel label allocated by the communication device for the ring tunnel; or the first label includes: a working tunnel label and a protection tunnel label allocated by the downstream device for the ring tunnel, and the second label includes: a working tunnel label and a protection tunnel label allocated by the communication device for the ring tunnel.

It can be seen from the technical solution that, in the communication device according to the embodiment of the present invention, by means of the detecting unit, the receiving unit and the sending unit, a label on the ring tunnel where the communication device is located is enabled to implement characteristics such as automatic allocation and automatic deletion, thereby solving problems in the prior art that a workload for configuration of a working ring is big and availability of an end-to-end service cannot be ensured.

Division of functional units in the foregoing embodiment of the communication device is only used as an example, and in an actual application, the functions may be allocated to be completed by different functional units according to requirements, for example, according to corresponding hardware configuration requirements or software implementation convenience, that is to say, the internal structure of the communication device is divided into different functional units, so as to implement all or a part of the described functions. Moreover, in the actual application, the corresponding functional units in this embodiment may be implemented through corresponding hardware, or through executing corresponding software by corresponding hardware. For example, the sending unit may be hardware capable of executing the function of the sending unit, for example, a transmitter (transmitter), and may also be a common processor or another hardware device capable of executing a corresponding computer program so as to complete the foregoing function; the detecting unit may be hardware capable of executing the function of the detecting unit, for example, a processor, and may also be another hardware device capable of executing a computer program to implement the foregoing function; the receiving unit may be hardware capable of executing the function of the receiving unit, for example, a receiver (receiver), and may also be a common processor or another hardware device capable of executing a corresponding computer program to implement the foregoing function; (the description principle may be applied to every embodiment provided in the specification).

Figure 15:
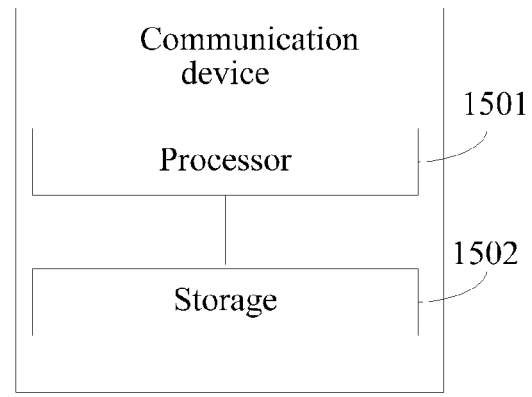
FIG. 15 is a schematic structural diagram of a communication device according to another embodiment of the present invention.

For example, the communication device may include a processor 1501 and a storage 1502, as shown in FIG. 15, the processor is configured to, after physical topology configuration of ring network protection is completed, detect connectivity between adjacent nodes; and when connectivity detection between the communication device and a downstream device is UP, receive a first label distribution message sent by the downstream device, where the first label distribution message includes: an identifier of a ring bearing a ring tunnel, an identifier of a tail device of the ring tunnel, an identifier indicating that a tail device label is ready, and a first label allocated by the downstream device for the ring tunnel;

the processor is further configured to, when the received first label distribution message includes the identifier indicating that the tail device label is ready, and when connectivity detection between the communication device and an upstream device is UP, send a second label distribution message to the upstream device, where the second label distribution message includes: the identifier of the ring bearing the ring tunnel, the identifier of the tail device of the ring tunnel, the identifier indicating that the tail device label is ready, and a second label allocated by the communication device for the ring tunnel; so that the upstream device learns, according to the identifier indicating that the tail device label is ready, that label allocation for all devices on the ring tunnel between the communication device and the tail device corresponding to the identifier of the tail device of the ring tunnel is completed. The upstream device and the communication device are adjacent devices on the ring tunnel, and the communication device and the downstream device are adjacent devices on the ring tunnel.

For example, the first label includes: a working tunnel label allocated by the downstream device for the ring tunnel, and the second label includes: a working tunnel label allocated by the communication device for the ring tunnel;

or, the first label includes: a protection tunnel label allocated by the downstream device for the ring tunnel, and the second label includes: a protection tunnel label allocated by the communication device for the ring tunnel;

or, the first label includes: a working tunnel label and a protection tunnel label allocated by the downstream device for the ring tunnel, and the second label includes: a working tunnel label and a protection tunnel label allocated by the communication device for the ring tunnel.

For another example, if the communication device is an intermediate device on the ring tunnel, the processor 1501, before receiving the first label distribution message, and when the connectivity detection between the communication device and the upstream device is UP, sends a third label distribution message to the upstream device, where the third label distribution message includes: the identifier of the ring bearing the ring tunnel, the identifier of the tail device of the ring tunnel, an identifier indicating that the tail device label is not ready, and the second label allocated by the communication device for the ring tunnel; so that the upstream device learns, according to the identifier indicating that the tail device label is not ready, that label allocation for one or more deices between the communication device and the tail device corresponding to the identifier of the tail device of the ring tunnel is not completed.

In an optional application scenario, after the ring tunnel bears a service, the processor 1501 is further configured to receive a first label retention message sent by the downstream device; when the connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

In another optional application scenario, the processor 1501 is further configured to receive a configuration message carrying change information of a ring tunnel where the communication device; and after receiving the configuration message, send a label withdraw message to the upstream device according to the configuration message, where the label withdraw message includes: the identifier of the tail device of the ring tunnel and the identifier of the ring bearing the ring tunnel, so that the upstream device determines, according to the identifier of the tail device of the ring tunnel and the identifier of the ring, a ring tunnel where the communication device is located, and deletes, according to the label withdraw message, the second label allocated by the communication device for the ring tunnel.

The storage 1502 may be configured to store the content in the first label distribution message, such as, the identifier of the ring bearing the ring tunnel, the identifier of the tail device of the ring tunnel, the identifier indicating that the tail device label is ready, and the first label allocated by the downstream device for the ring tunnel. This embodiment is only used as an example for illustration, and does not limit the content stored in the storage.

A person of ordinary skill in the art may understand that, all or a part of the steps of the foregoing method embodiments may be implemented by a program instructing relevant hardware. The aforementioned program may be stored in a computer readable storage medium. When the program runs, the steps of the forgoing method embodiments are performed. The foregoing storage medium includes various media capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that modifications still may be made to the technical solutions described in the foregoing embodiments, or equivalent replacements may be made to some or all the technical features thereof; and such modifications or replacements do not make essence of corresponding technical solutions depart from the scope of the technical solutions of the embodiments of the present invention.

What is claimed is:

1. A method for label automatic allocation in ring network protection, wherein:
    after physical topology configuration of the ring network protection is completed, testing connectivity between adjacent nodes,
    when a first node is an intermediate node of a ring tunnel, and connectivity detection between a downstream node and the first node is UP, receiving, by the first node, a first label distribution message sent by the downstream node, wherein the first label distribution message includes: an identifier of a ring bearing the ring tunnel, an identifier of a tail node of the ring tunnel, an identifier indicating that a tail node label is ready, and a first label allocated by the downstream node for the ring tunnel;
    according to the identifier indicating that the tail node label is ready in the first label distribution message, when connectivity detection between the first node and an upstream node is UP, sending, by the first node, a second label distribution message to the upstream node, wherein the second label distribution message includes: the identifier of the ring bearing the ring tunnel, the identifier of the tail node of the ring tunnel, the identifier indicating that the tail node label is ready, and a second label allocated by the first node for the ring tunnel, to enable the upstream node to learn, according to the identifier indicating that the tail node label is ready, that label allocation for all nodes on the ring tunnel between the first node and the tail node corresponding to the identifier of the tail node of the ring tunnel is completed; and
    when the upstream node is not a head node on the ring tunnel, according to the identifier indicating that the tail node label is ready in the second label distribution message, when connectivity detection between the upstream node and a second node is UP, sending, by the upstream node, a third label distribution message to the second node, until the head node on the ring tunnel receives a fourth label distribution message sent by a downstream adjacent node of the head node on the ring tunnel, and after the head node on the ring tunnel receives the fourth label distribution message, the head node on the ring tunnel learns, according to the identifier indicating that the tail node label is ready in the fourth label distribution message, that label allocation of all nodes on the ring tunnel except the head node is completed, and starting, by the ring tunnel, to bear a service, wherein, the second node is an adjacent upstream node of the upstream node on the ring tunnel, the upstream node and the first node are adjacent nodes on the ring tunnel, the first node and the downstream node are adjacent nodes on the ring tunnel and the tail node is an off-ring node on the ring tunnel;

wherein, before the receiving, by the first node, the first label distribution message sent by the downstream node, the method further comprises:

when the connectivity detection between the first node and the upstream node is UP, sending, by the first node, a fifth label distribution message to the upstream node, wherein the fifth label distribution message comprises: the identifier of the ring bearing the ring tunnel, the identifier of the tail node of the ring tunnel, an identifier indicating that the tail node label is not ready, and the second label allocated by the first node for the ring tunnel, to enable the upstream node to learn, according to the identifier indicating that the tail node label is not ready, that label allocation for one or more nodes between the first node and the tail node corresponding to the identifier of the tail node of the ring tunnel is not completed.

2. The method according to claim 1, wherein
the first label comprises: a working tunnel label allocated by the downstream node for the ring tunnel, and the second label comprises: a working tunnel label allocated by the first node for the ring tunnel.

3. The method according to claim 1, further comprising:
when the first node is the tail node on the ring tunnel, and the connectivity detection between the first node and the upstream node is UP, sending, by the first node, the second label distribution message to the upstream node.

4. The method according to claim 1, further comprising:
if the first node is the head node on the ring tunnel, after receiving the first label distribution message, learning, by the first node according to the identifier indicating that the tail node label is ready in the first label distribution message, that label allocation for all nodes on the ring tunnel except the first node is completed, and starting, by the ring tunnel, to bear the service.

5. The method according to claim 1, wherein, the first label distribution message, the second label distribution message, the third label distribution message, the fourth label distribution message, and the fifth label distribution message are all continuity check messages (CCM).

6. The method according to claim 1, wherein, that the connectivity detection between the downstream node and the first node is UP is:
the downstream node receives a connectivity detection message sent by the first node.

7. The method according to claim 1, wherein
the first label comprises: a protection tunnel label allocated by the downstream node for the ring tunnel, and the second label comprises: a protection tunnel label allocated by the first node for the ring tunnel.

8. The method according to claim 1, wherein
the first label comprises: a working tunnel label and a protection tunnel label allocated by the downstream node for the ring tunnel, and the second label comprises: a working tunnel label and a protection tunnel label allocated by the first node for the ring tunnel.

9. The method according to claim 1, wherein
the first label distribution message, the second label distribution message, the third label distribution message, the fourth label distribution message, and the fifth label distribution message are all connectivity verification (CV) messages.

10. The method according to claim 1, wherein
the first label distribution message, the second label distribution message, the third label distribution message, the fourth label distribution message, and the fifth label distribution message are all loopback message (LBM).

11. A non-transitory computer-readable storage communication device, wherein the communication device is a physical device on a ring network, and the communications device is an intermediate node of a ring tunnel, wherein the communication device stores a set of instructions that may be executed to:

detect connectivity between adjacent nodes, after physical topology configuration of ring network protection is completed;

receive a first label distribution message sent by a downstream device, wherein the first label distribution message comprises: an identifier of a ring bearing the ring tunnel, an identifier of a tail device of the ring tunnel, an identifier indicating that a tail device label is ready, and a first label allocated by the downstream device for the ring tunnel; and when the first label distribution message comprises the identifier indicating that the tail device label is ready, and when the communication device detects that connectivity between the communication device and an upstream device is UP, send a second label distribution message to the upstream device, wherein the second label distribution message comprises: the identifier of the ring bearing the ring tunnel, the identifier of the tail device of the ring tunnel, the identifier indicating that the tail device label is ready, and a second label allocated by the communication device for the ring tunnel, to enable the upstream device to learn, according to the identifier indicating that the tail device label is ready, that label allocation for all devices on the ring tunnel between the communication device and the tail device corresponding to the identifier of the tail device of the ring tunnel is completed, wherein the upstream device and the communication device are adjacent devices on the ring tunnel, and the communication device and the downstream device are adjacent devices on the ring tunnel;

wherein the communications device further stores instructions that may be executed to: send a third label distribution message to the upstream device, before receiving the first label distribution message, when the communications device detects that the connectivity between the communication device and the upstream device is UP, wherein the third label distribution message comprises: the identifier of the ring bearing the ring tunnel, the identifier of the tail device of the ring tunnel, an identifier indicating that the tail device is not ready, and the second label allocated by the communication device for the ring tunnel, to enable the upstream device to learn, according to the identifier indicating that the tail device is not ready, that label allocation of one or more devices between the communication device and the tail device corresponding to the identifier of the tail device of the ring tunnel is not completed.

12. The non-transitory computer-readable storage communication device according to claim 11, wherein
the first label comprises: a working tunnel label allocated by the downstream device for the ring tunnel, and the second label comprises: a working tunnel label allocated by the communication device for the ring tunnel.

13. The non-transitory computer-readable storage communication device according to claim 11, wherein
the first label distribution message, the second label distribution message and the third label distribution message are all continuity check messages (CCMs).

14. The non-transitory computer-readable storage communication device according to claim 11, wherein the communication device further stores instructions that may be executed to:
receive a first label retention message sent by the downstream device, after the ring tunnel bears a service, and
after receiving the first label retention message, when connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

15. The non-transitory computer-readable storage communication device according to claim 14, wherein, the first label retention message comprises: the identifier of the tail device of the ring tunnel and the identifier of the ring bearing the ring tunnel; wherein the communication device further stores instructions that may be executed to:
receiving the first label retention message, determine, according to the identifier of the tail device and the identifier of the ring bearing the ring tunnel, a ring tunnel where the downstream device is located, and store the first label allocated by the downstream device for the ring tunnel; and
when the connectivity detection between the communication device and the downstream device is Down, retain, according to the first label retention message, the first label allocated by the downstream device for the ring tunnel, and after the connectivity detection between the communication device and the downstream device is updated to UP, continue to forward the service by adopting the retained first label allocated by the downstream device for the ring tunnel.

16. The non-transitory computer-readable storage communication device according to claim 14, wherein, the first label retention message comprises: the identifier of the ring bearing the ring tunnel; wherein the communications device further stores instructions that may be executed to:
store labels allocated by the downstream device for all ring tunnels born on the ring corresponding to the identifier of the ring bearing the ring tunnel;
when the connectivity detection between the communication device and the downstream device is Down, retain, according to the first label retention message, the labels allocated by the downstream device for all the ring tunnels on the ring; and
after the connectivity detection between the communication device and the downstream device is updated to UP, continue to forward the service by adopting the retained labels allocated by the downstream device for all the ring tunnels on the ring bearing the ring tunnel.

17. The non-transitory computer-readable storage communication device according to claim 11, wherein the communications device further stores instructions that may be executed to:
after receiving the configuration message, send a label withdraw message to the upstream device according to the configuration message, wherein the label withdraw message comprises: the identifier of the tail device of the ring tunnel and the identifier of the ring bearing the ring tunnel, so that the upstream device determines, according to the identifier of the tail device of the ring tunnel and the identifier of the ring bearing the ring tunnel, the ring tunnel where the communication device is located, and deletes, according to the label withdraw message, the second label allocated by the communication device for the ring tunnel.

18. The non-transitory computer-readable storage communication device according to claim 11, wherein
the first label comprises: a protection tunnel label allocated by the downstream device for the ring tunnel, and the second label comprises: a protection tunnel label allocated by the communication device for the ring tunnel.

19. The non-transitory computer-readable storage communication device according to claim 11, wherein
the first label comprises: a working tunnel label and a protection tunnel label allocated by the downstream device for the ring tunnel, and the second label comprises: a working tunnel label and a protection tunnel label allocated by the communication device for the ring tunnel.

20. The non-transitory computer-readable storage communication device according to claim 11, wherein
the first label distribution message, the second label distribution message, and the third label distribution message are all connectivity verification (CV) messages;
or
the first label distribution message, the second label distribution message, and the third label distribution message are all loopback messages (LBMs).

* * * * *